(12) United States Patent
Zhu et al.

(10) Patent No.: US 10,095,798 B2
(45) Date of Patent: Oct. 9, 2018

(54) METHOD FOR DISPLAYING WEBSITE AUTHENTICATION INFORMATION AND BROWSER

(71) Applicant: BEIJING QIHOO TECHNOLOGY COMPANY LIMITED, XICHENG DISTRICT, BEIJING (CN)

(72) Inventors: Mei Zhu, Beijing (CN); Baosheng Li, Beijing (CN); Shangyue Ji, Beijing (CN); Xiaolong Wang, Beijing (CN); Huan Ren, Beijing (CN)

(73) Assignee: BEIJING QIHOO TECHNOLOGY COMPANY LIMITED, Xicheng District, Beijing (CN)

( * ) Notice: Subject to any disclaimer, the term of this patent is extended or adjusted under 35 U.S.C. 154(b) by 319 days.

(21) Appl. No.: 14/780,132

(22) PCT Filed: Mar. 14, 2014

(86) PCT No.: PCT/CN2014/073478
§ 371 (c)(1),
(2) Date: Sep. 25, 2015

(87) PCT Pub. No.: WO2014/154095
PCT Pub. Date: Oct. 2, 2014

(65) Prior Publication Data
US 2016/0048526 A1    Feb. 18, 2016

(30) Foreign Application Priority Data

Mar. 25, 2013  (CN) .......................... 2013 1 0097545

(51) Int. Cl.
*G06F 17/30* (2006.01)
*H04L 29/06* (2006.01)
(Continued)

(52) U.S. Cl.
CPC ...... *G06F 17/3089* (2013.01); *G06F 17/2247* (2013.01); *G06F 17/30864* (2013.01);
(Continued)

(58) Field of Classification Search
CPC ..... H04L 63/1483; H04L 67/02; H04L 63/08; G06F 17/2247; G06F 17/3089; G06F 17/30864
See application file for complete search history.

(56) References Cited

U.S. PATENT DOCUMENTS

| | | | |
|---|---|---|---|
| 2003/0139910 A1* | 7/2003 | Yamamoto | H04L 63/08 |
| | | | 702/188 |
| 2009/0100505 A1 | 4/2009 | Shaty | |
| 2010/0275018 A1* | 10/2010 | Pedersen | G06T 19/00 |
| | | | 713/168 |
| 2010/0275024 A1* | 10/2010 | Abdulhayoglu | G06F 21/6218 |
| | | | 713/175 |

(Continued)

FOREIGN PATENT DOCUMENTS

| | | |
|---|---|---|
| CN | 102882886 | 1/2013 |
| CN | 102917049 | 2/2013 |
| CN | 103179125 | 6/2013 |

OTHER PUBLICATIONS

China Office Action for CN201310097545.4, dated May 6, 2015.
International Search Report for PCT/CN2014/073478 dated May 30, 2014.

*Primary Examiner* — Yonas Bayou
(74) *Attorney, Agent, or Firm* — Grogan, Tuccillo & Vanderleeden, LLP

(57) ABSTRACT

Disclosed in the present invention are a method for displaying website authentication information and a browser, the method comprising: acquiring, by cloud query, authentication parameter information of a website provided by a network address authentication server after a network address change event is triggered, wherein the authentication parameter information at least comprises display picture information of authentication information, and the display picture information of the authentication information is generated by the network address authentication server
(Continued)

according to the source of the authentication information and website type information; and displaying the authentication information of the website in the browser according to the authentication parameter information. According to the technical solution provided by the present invention, the information authenticated by authority can be displayed in real time when users visit the website, enabling the users to have a proper understanding of the security of the currently-visited website.

18 Claims, 7 Drawing Sheets

(51) Int. Cl.
    *G06F 17/22*     (2006.01)
    *H04L 29/08*     (2006.01)

(52) U.S. Cl.
    CPC .......... *H04L 63/08* (2013.01); *H04L 63/1483* (2013.01); *H04L 67/02* (2013.01)

(56) References Cited

U.S. PATENT DOCUMENTS

| | | | |
|---|---|---|---|
| 2011/0126192 A1* | 5/2011 | Frost | G06F 8/61 717/178 |
| 2011/0153867 A1* | 6/2011 | van de Ven | H04L 29/12811 709/245 |
| 2013/0111040 A1* | 5/2013 | Vempati | H04L 63/029 709/227 |
| 2014/0344907 A1* | 11/2014 | Wan | G06F 17/30893 726/6 |
| 2014/0379841 A1* | 12/2014 | Zong | G06F 17/30902 709/213 |
| 2015/0012987 A1* | 1/2015 | Tian | H04L 63/0815 726/6 |
| 2015/0089512 A1* | 3/2015 | Li | G06F 17/3089 719/313 |
| 2015/0242222 A1* | 8/2015 | Chen | G06F 9/44526 717/172 |
| 2016/0112405 A1* | 4/2016 | He | H04L 63/1483 726/10 |
| 2016/0283499 A1* | 9/2016 | Cao | G06Q 30/0277 |

* cited by examiner

METHOD FOR DISPLAYING WEBSITE AUTHENTICATION INFORMATION AND BROWSER

FIELD OF THE DISCLOSURE

The disclosure relates to the field of computer networking technology, particularly to a method for displaying website authentication information and a browser.

BACKGROUND OF THE DISCLOSURE

Network browser is a type of software for displaying webpage server or files in file system and enabling users to interact with these files. Content displayed by network browser comprises text, image and other information on network like World Wide Web or Local Area Network. These text and image can be hyperlinks linked to other network addresses, and users can promptly and easily browse various messages through these hyperlinks. Webpage is generally HTML (Hypertext Markup Language) format. Some webpages can be displayed correctly only using specific browser. Network address generally refers to address of webpage on the internet. If you want to visit another computer on the internet using one computer, you have to know the network address of the other. The network address mentioned here actually indicates two connotations, i.e. IP (Internet Protocol) address and domain name address.

The address bar on network browser is usually for inputting a network address or displaying the network address when visiting a network page. Network browser cannot identify network address. Some illegal websites defraud users of trust and damage users' interest by means of making the name of the network address similar to a standard website.

SUMMARY OF THE DISCLOSURE

In view of aforesaid problems, the disclosure is put forward to provide a method for displaying website authentication information and a corresponding browser to overcome aforesaid problems or at least partly solve aforesaid problems.

According to one aspect of the disclosure, a method for displaying website authentication information is provided and comprises: acquiring, by cloud query, authentication parameter information of a website provided by a network address authentication server after a network address change event is triggered, wherein the authentication parameter information at least comprises display picture information of authentication information, and the display picture information of the authentication information is generated by the network address authentication server according to source of the authentication information and website type information; and displaying a the authentication information of the website in a browser according to the authentication parameter information.

According to another aspect of the disclosure, a browser is provided and comprises: a cloud query module, configured to acquire authentication parameter information of a website provided by a network address authentication server by cloud query after a network address change event is triggered, wherein the authentication parameter information at least comprises display picture information of authentication information, and the display picture information of authentication information is generated by the network address authentication server according to the source of the authentication information and the website type information; an authentication information display module, configured to display the authentication information of the website in a browser according to the authentication parameter information.

According to another aspect of the disclosure, a computer program is provided and comprises a computer readable code; when the computer readable code is running on a computing device, the computing device will execute aforesaid method for displaying website authentication information.

According to another aspect of the disclosure, a computer readable medium is provided, wherein storing aforesaid computer program.

Beneficial effect of the disclosure is that:

According to the method for displaying website authentication information and the browser provided by the disclosure, authentication parameter information of a website provided by a network address authentication server is acquired by cloud query after a network address change event is triggered, and the authentication information of the website is displayed in the browser according to the authentication parameter information. In this way, information authenticated by authority can be displayed in real time when users visit the website, enabling the users to have a proper understanding of the security of the currently-visited website.

Above description is only a summary of the technical scheme of the disclosure. In order to know the technical means of the disclosure more clearly so that it can be put into effect according to the content of the description, and to make aforesaid and other purpose, features and advantages of the disclosure clearer, embodiments of the disclosure are listed below.

BRIEF DESCRIPTION OF THE DRAWINGS

By reading the detailed description of the preferably selected embodiments below, various other advantages and benefits become clear for a person of ordinary skill in the art. The drawings are only used for showing the purpose of the preferred embodiments and are not intended to limit the present invention. And in the whole drawings, same drawing reference signs are used for representing same components. In the drawings.

EMBODIMENTS

The disclosure is described in further detail with reference to the drawings and embodiments below.

Figure 1:
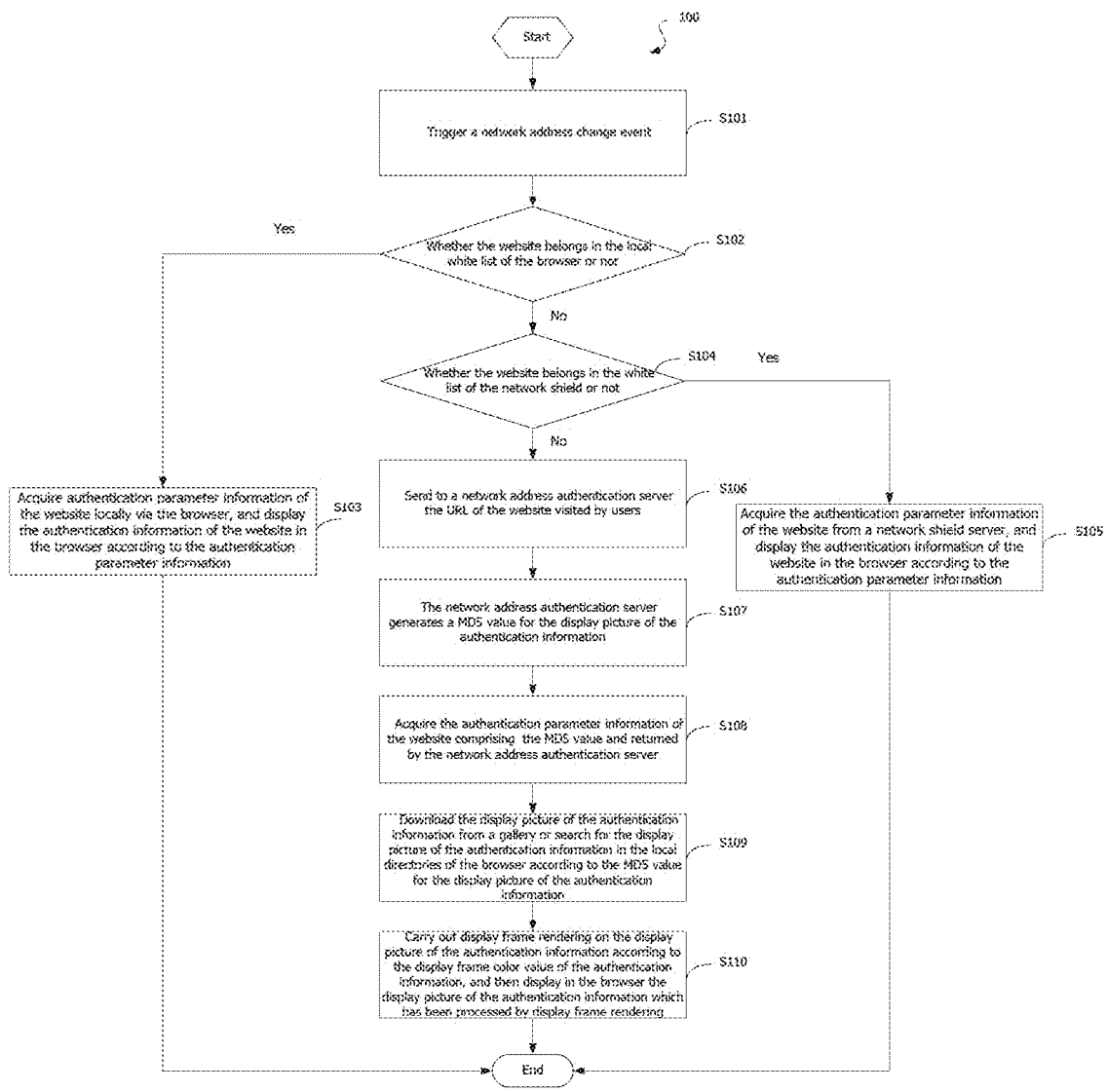
FIG. 1 shows a flowchart for a method for displaying website authentication information according to an embodiment of the disclosure.

FIG. 1 shows a flowchart for method 100 for displaying website authentication information according to an embodiment of the disclosure. As is shown in FIG. 1, the method 100 begins with step S101, wherein, a browser first triggers a network address change event when users visit a website. Users will input the network address of the website in the address bar of the browser or link to the website through other websites when visiting a website. By this time, the network address (e.g. URL) of the website in the address bar of the browser will be changed. Once the browser detects the change, a URL change event will be triggered.

Then, the method 100 enters into step S102, wherein the browser inquires local white list and estimates whether the website belongs in the local white list of the browser or not. If yes, execute step S103; if not, execute step S104. The local white list of the browser is credible white list, wherein storing URL of credible websites and authentication parameter information thereof. The browser inquires local white list according to the URL of the website visited by users. If the website belongs in the local white list, execute step S103; if the website does not belong in the local white list, execute step S104.

In step S103, acquire the authentication parameter information of the website locally via the browser, and display the authentication information of the website in the browser according to the authentication parameter information, and the method 100 ends up. If the website visited by users belongs in the local white list, the authentication parameter information of the website can be found in the local white list. The authentication parameter information at least comprises display picture information of the authentication information. Optionally, display picture information of the authentication information is the MD5 (Message Digest Algorithm 5) value for a display picture of the authentication information. The browser can search for the display picture of the authentication information in local directories of the browser or download the display picture of the authentication information from a gallery according to the MD5 value for the display picture of the authentication information. The specific method for searching for or downloading the display picture of the authentication information will be described in further detail later. After acquiring the display picture of the authentication information, the display picture of the authentication information is displayed on the side of the address bar of the browser. In this way, the browser can present the authorized authentication information of the website visited by users to users using the display picture of the authentication information, enabling the users to have a proper understanding of the security of the currently-visited website.

What should be noticed is that aforesaid step S102 and step S103 are optional steps, that is, after step S101 the method 100 can directly enter into subsequent steps, without performing the step of inquiring the local white list of the browser.

In step S104, the browser inquires a white list of a network shield directly or indirectly and estimates whether the website belongs in the white list of the network shield or not. If yes, execute step S105; if not, execute step S106. The white list of the network shield is credible white list stored in a network shield server, wherein storing URL of credible websites and authentication parameter information thereof. In an indirect way, the browser reports the URL of the website visited by users to the network shield server, and then the network shield server estimates whether the website belongs in the white list of the network shield or not; or in a direct way, the network shield server returns the white list of the network shield to the browser, and then the browser inquires the white list of the network shield and estimates whether the website belongs in the white list of the network shield or not. If the website visited by users belongs in the white list of the network shield, execute step S105; if the website does not belong in the white list of the network shield, execute step S106.

In step S105, the browser acquires authentication parameter information of the website from the network shield server and displays the authentication information of the website in the browser according to the authentication parameter information, and the method 100 ends up. If the network shield server estimates that the website visited by users belongs in the white list of the network shield, the browser acquires the authentication parameter information of the website from the network shield server; or if the browser estimates that the website visited by users belongs in the white list of the network shield, the browser acquires the authentication parameter information of the website from the white list of the network shield returned by the network shield server. The authentication parameter information at least comprises display picture information of the authentication information. Optionally, display picture information of the authentication information is the MD5 value for the display picture of the authentication information. The browser can search for the display picture of the authentication information in the local directories of the browser or download the display picture of the authentication information from the gallery according to the MD5 value for the display picture of the authentication information. The specific method for searching for or downloading the display picture of the authentication information will be described in further detail later. After acquiring the display picture of the authentication information, the display picture of the authentication information is displayed on the side of the address bar of the browser. In this way, the browser can present the authorized authentication information of the website visited by users to users by the display picture of the authentication information, enabling the users to have a proper understanding of the security of the currently-visited website.

What should be noticed is that aforesaid step S104 and step S105 are optional steps, that is, after step S101 or step S102 the method 100 can directly enter into subsequent steps, without performing the step of inquiring the white list of the network shield.

In other words, the method 100 can comprise steps of inquiring the local white list in the browser and inquiring the white list of the network shield at the same time, or only comprise one step of inquiring the local white list in the browser or inquiring white list of the network shield, or comprise neither the step of inquiring the local white list in the browser nor the step of inquiring the white list of the network shield.

In step S106, the browser sends to a network address authentication server the URL of the website visited by users. The network address authentication server is a server exclusively used for providing authentication information authenticated by authority for the browser. The information included in the network address authentication server is mainly from information of a browser provider, and/or website registration license information, and/or information provided by authentication and authorization institute. Wherein information provided by the browser provider and authentication and authorization institute mainly comprises authentication information of following types of websites: enterprise, brand official website, school, shopping mall, group buying site, bank, hospital, game official website, government, public institution, and the like. The authentication and authorization institute usually provides corresponding information based on the process authenticated by CA (Certificate Authority) of the third party. The website registration license information is information recorded by authorized registration institute, such as information recorded at the registration center of Ministry of Industry and Information ICP (telecom and information service business certificate of the People's Republic of China). Types of registered websites mainly includes: enterprise, government, army, social organization, public institution and individual. The network address authentication server of the disclosure can be an open platform, and various authentication and authorization institutes and/or authorized registration agencies can access the platform via configured interface, so as to provide information for the network address authentication server.

After step S106, the method 100 enters into step S107. Wherein, on the basis of the URL of the website provided by the browser, the network address authentication server inquires the source of the authentication information and the website type information corresponding to the URL from the information included in the network address authentication server, and then processes a original display picture to obtain the display picture of the authentication information according to the source of the authentication information and the website type information corresponding to the URL, and then generates display picture information of the authentication information. Optionally, the display picture information of the authentication information is specified as a MD5 value for the display picture of the authentication information.

Specifically, the network address authentication server inquires the source of the authentication information and the website type information corresponding to the URL from aforesaid information of the browser provider, and/or website registration license information, and/or information provided by authentication and authorization institute. Wherein, the source of the authentication information is about identification information of the authentication information from the browser provider, authentication and authorization institute or authorized registration institute. Identification "0" is used in the method showing that the authentication information is from the browser provider. Identification "1" is used showing that the authentication information is from authentication and authorization institute or authorized registration institute. However, the disclosure is not limited to the above. In order to provide more elaborate information, three different identifications can be adopted to identify the three sources. The website type information is identification information about website type corresponding to the URL of the website. In the present method, identification of "enterprise" is "1"; identification of "shopping mall" is "2"; identification of "government" is "3"; identification of "payment" is "4"; identification of "bank" is "5"; identification of "public institution" is "6"; identification of "group buying site" is "7"; identification of "school" is "8"; identification of "hospital" is "9"; identification of "game official website" is "10"; identification of "brand official website" is "11". In order to provide more elaborate information, the website type information can include identification information of further sorted website subtype on the basis of above mentioned website type. The disclosure does not limit this.

In the present method, the original display picture is provided by the browser provider and/or authentication and authorization institute. The types of original display pictures provided by different authentication and authorization institutes can be different. The network address authentication server can reprocess the original display picture to obtain the display picture of the authentication information according to the source of the authentication information and the website type information corresponding to the URL of the website visited by users. As an optional embodiment, the source of the authentication information decides an authentication icon displayed on the display picture of the authentication information, and background color and/or text color of the display picture of the authentication information. The website type information decides text contents displayed on the display picture of the authentication information. It will be described by referring to a specific embodiment below.

Figure 2:
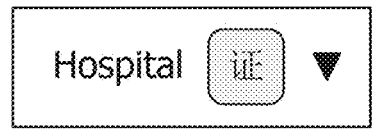
FIG. 2 shows a diagram for an example of a display picture of the authentication information.
Figure 3:
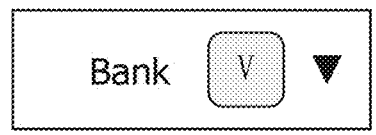
FIG. 3 shows a diagram for another example of a display picture of the authentication information.

FIG. 2 shows a diagram for an example of a display picture of the authentication information. For the example shown in FIG. 2, the source of the authentication information corresponding to the URL of the website visited by users is identification "1", showing that the authentication information of the website is from authentication and authorization institute or authorized registration institute. For this source, the authentication icon displayed on the display picture of the authentication information is "TIE" (certificate); The background color of the display picture of the authentication information is green and the text color is also green (FIG. 2 is a schematic diagram, thus the corresponding color is not displayed). The website type information corresponding to the URL of the website visited by users is identification "9", showing that the website is a hospital website and the display picture of the authentication information displays "Hospital". FIG. 3 shows a diagram for another example of a display picture of the authentication information. For the example shown in FIG. 3, the source of the authentication information corresponding to the URL of the website visited by users is identification "0", showing that the authentication information of the website is from the browser provider. For this source, the authentication icon displayed on the display picture of the authentication information is "V". The background color of the display picture of the authentication information is green and the text color is also green (FIG. 3 is a schematic diagram, thus the corresponding color is not displayed). The website type information corresponding to the URL of the website visited by users is identification "5", showing that the website is a bank website and the display picture of the authentication information displays "Bank".

After obtaining the display picture shown in FIG. 2 or FIG. 3, the MD5 value for the display picture is generated. The MD5 value is the display picture information of the authentication information.

After step S107, the method 100 enters into step S108, wherein the browser acquires the authentication parameter information of the website returned by the network address authentication server. The authentication parameter information returned by the network address authentication server at least comprises the MD5 value for the display picture of the authentication information (represented by parameter m hereinafter), and, in addition, comprises domain name information of the website (represented by parameter d hereinafter) and the display frame color value of the authentication information (represented by parameter c hereinafter). Optionally, the authentication parameter information can also comprise the source of the authentication information and the website type information (parameter s is used for representing the source of the authentication information and the website type information hereinafter).

As a specific example, the format of the data returned by the network address authentication server to the browser is as follows:

trust.info:{d: domain name}{c: display frame color value}{m: MD5 value for display picture}and kx.info:{d: domain name}{s: source: type: subtype 1: subtype 2: subtype 3 . . . }

The description of aforesaid format of the data is shown in Table 1 and Table 2.

TABLE 1

Data Format Description Table 1

| Item | Description | Fault-Tolerance Processing | e.g. |
|---|---|---|---|
| {d:domain name} | domain name information of website | The authentication information of the website is not displayed in the browser when d is empty or abnormal data. | {d:360.cn} |
| {c: display frame color value} | color of the display frame: 1 is blue; 2 is green | The authentication information of the website is not displayed in the browser when c is not the assigned numerical value 1 or 2. | {c:1} |
| {m: MD5 value for display picture} | acquire the MD5 value for the display picture | The authentication information of the website is not displayed in the browser when the value cannot be acquired or the display picture is not downloaded correctly. | {m:e79389bda6a764850c81dd1faa8c0776} |

TABLE 2

Data Format Description Table 2

| Item | | Description | e.g. |
|---|---|---|---|
| {d:domain name} | | Domain name information of the website | {d:360.cn} |
| {s: source: type: subtype 1: subtype 2: subtype 3 . . .} | source | 0 is a browser provider; 1 is authentication and authorization institute or authorized registration institute | {s:0:4} |
| | type | 1-enterprise 2-shopping mall 3-government 4-payment 5-bank 6-public institution 7-group buying site 8-school 9-hospital 10-game official website 11-brand official website | |
| | subtype 1: subtype 2: subtype 3 . . . | not used at present | |

After step S108, the method 100 enters into step S109, wherein downloading the display picture of the authentication information from the gallery or searching for the display picture of the authentication information in the local directories of the browser according to the MD5 value for the display picture of the authentication information. A part of display pictures of the authentication information are stored in the local directories of the browser. If the display picture corresponding to the MD5 value for the display picture of the authentication information returned by the network address authentication server is not stored in the local directories of the browser, it can be downloaded from the gallery.

Specifically, after the browser receives the authentication parameter information returned by the network address authentication server, it is first estimated that whether the display picture consistent with the MD5 value for the display picture of the authentication information is in the local directories of the browser or not; if yes, a corresponding display picture is obtained as the display picture of the authentication information; if not, the display picture is downloaded from the gallery as the display picture of the authentication information. The MD5 value for the display picture downloaded from the gallery is consistent with the MD5 value for the display picture of the authentication information. For example, suppose the URL of the gallery is: http://p0.qhimg.com/d/webidnameplate/filename. If the data returned by the network address authentication server includes {trust.info:{d:360.cn}{c:1}{m:e79389bda6a764850c81dd1faa8c0776}{v:1.0}{p:*}}, the display picture can be downloaded by visiting http://p0.qhimg.com/d/webidnameplate/e79389bda6a764850c81dd1faa8c0776.

According to fault-tolerance processing mechanism, if downloading the display picture from the gallery fails, the authentication information of the website is not displayed in the browser. Besides, if the domain name information of the website of the authentication parameter information returned by the network address authentication server is empty or abnormal information, the authentication information of the website is not displayed in the browser. If the display frame color value of the authentication parameter information returned by the network address authentication server is not assigned numerical value (e.g. 1 or 2), the authentication information of the website is not displayed in the browser.

Figure 4:
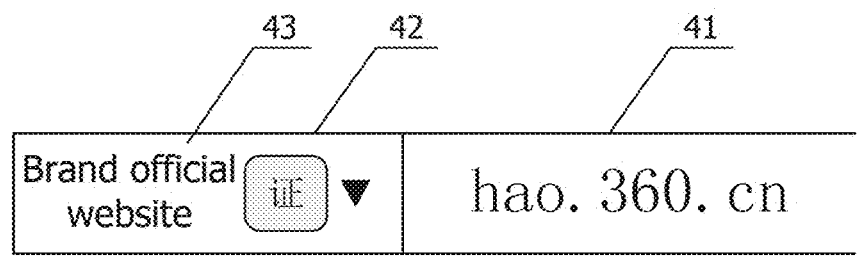
FIG. 4 shows a diagram for displaying a display picture of the authentication information in a browser.

After step S109, the method 100 enters into step S110, wherein carrying out display frame rendering on the display picture of the authentication information according to the display frame color value of the authentication information, and then displaying in the browser the display picture of the authentication information which has been processed by the display frame rendering. If the display frame color value of the authentication information is 1, the display frame of the display picture of the authentication information is rendered as blue; if the display frame color value of the authentication information is 2, the display frame of the display picture of the authentication information is rendered as green. FIG. 4 shows a diagram for displaying a display picture of the authentication information in a browser. As is shown in FIG. 4, the display picture of the authentication information 42 is displayed on the left side of the address bar 41 of the browser. The color of the display frame 43 of the display picture of the authentication information is decided by the display frame color value of the authentication information (FIG. 4 is a schematic diagram, thus the corresponding color is not displayed).

Furthermore, in addition to returning the authentication parameter information of the website visited by users, the network address authentication server in the method can also return an authentication parameter information list consisting of the authentication parameter information of websites corresponding to sub-domain names of over second level of the website. The browser stores the authentication parameter information list in the browser locally. After a network address change event of the websites corresponding to the sub-domain names of over second level of the website is triggered, directly inquire the authentication parameter information of the website in the browser locally and display the authentication information of the website in the browser according to the authentication parameter information. For example, suppose the website visited by users is qq.com. In addition to returning the authentication parameter information of qq.com, the network address authentication server also returns the authentication parameter information of the website corresponding to the second level sub-domain name mail.qq.com. Later when users visit mail.qq.com, the browser directly inquires the authentication parameter information of mail.qq.com in local and displays the authentication information of the website in the browser according to the authentication parameter information, enabling the browser to have real-time response and display the authentication information. Optionally, abovementioned authentication parameter information list can be stored in aforesaid local white list of the browser. What should be noticed is that in addition to the network address authentication server, the information in the local white list of the browser is also from other channels. The disclosure does no limit this.

Figure 5:
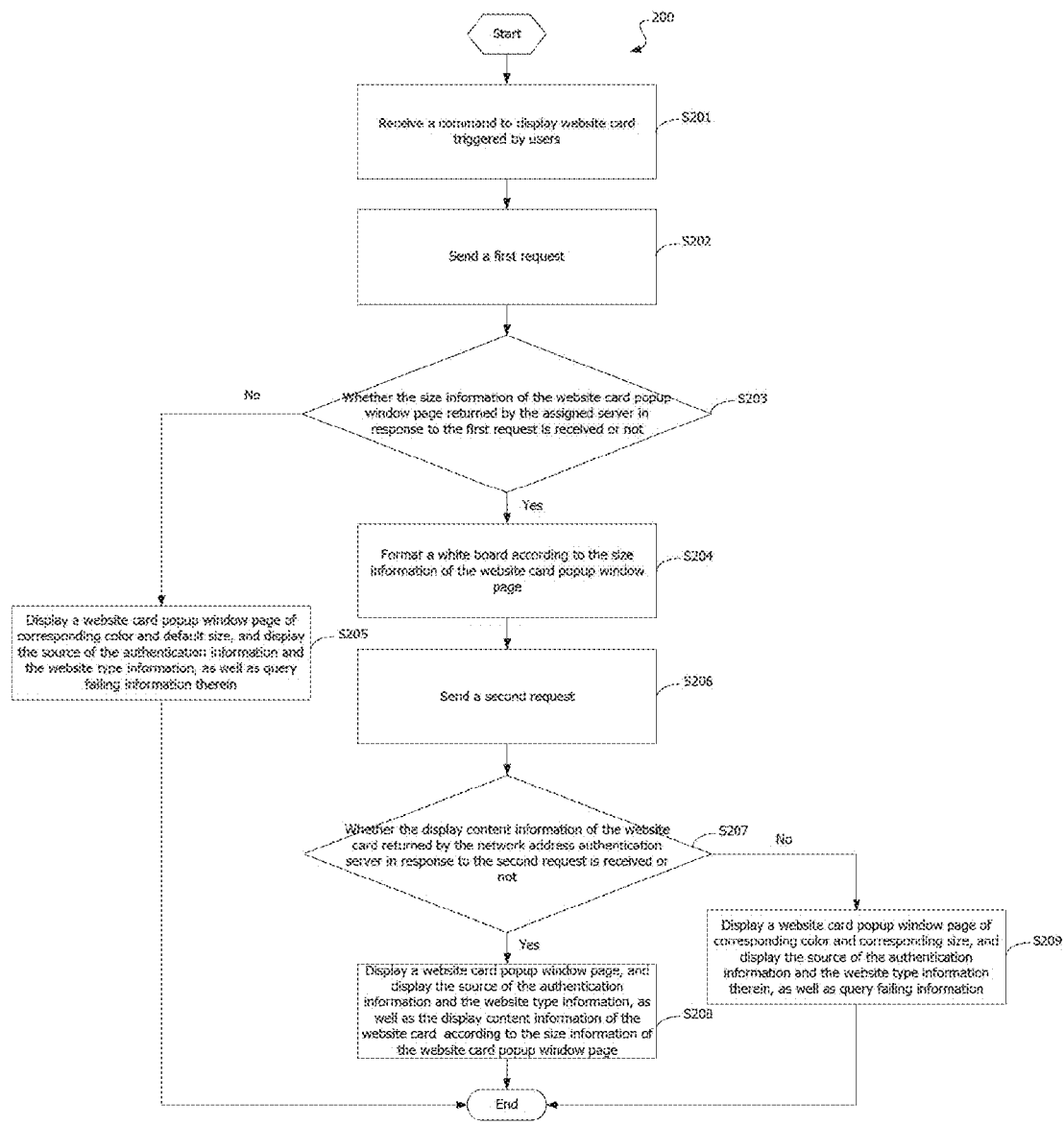
FIG. 5 shows a flowchart for a method for displaying website card according to an embodiment of the disclosure.

In order to provide more detailed and comprehensive authentication information for users, in addition to displaying aforesaid display picture of the authentication information, the disclosure can also further display website card according to command triggered by users. FIG. 5 shows a flowchart for method 200 for displaying website card according to an embodiment of the disclosure. The steps shown in FIG. 5 are executed after aforesaid step S110.

As is shown in FIG. 5, the method 200 begins with step S201, wherein the browser receives a command to display website card triggered by users. As is shown in FIGS. 2, 3 and 4, a drop down arrow is displayed on the side of the authentication icon displayed on the display picture of the authentication information. Users can trigger the command to display website card by clicking the drop down arrow.

Subsequently, the method 200 enters into step S202, wherein the browser sends a first request to an assigned server according to the command to display the website card triggered by users, requesting for obtaining size information of a website card popup window page. So-called assigned server is the server for setting the size of the website card popup window page. It can be a server of the browser provider, or a network address authentication server. The first request carries the domain name information of the website (e.g. host). For example, suppose the interface address of the assigned server is:

http://webid.360.cn/nameplate_v2_conf.php. The first request can carry following parameters:

host=current domain name port number can be elided
key=md5(host+secret key) secret key is preset value
v=version number of a browser After step S202, the method 200 enters into step S203, wherein the browser estimates whether the size information of the website card popup window page returned by the assigned server in response to the first request is received or not. If yes, the method 200 enters into step S204; if not, the method 200 enters into step S205. If the browser receives the size information of the website card popup window page, it is showing that the first request succeeds; if the browser does not receive the size information of the website card popup window page, it is showing that the first request fails.

In step S204, a white board is formatted according to the size information of the website card popup window page. The size information of the website card popup window page is generally the length and width of the website card popup window page (returned value is: length*width, e.g. 400*200). A white board of corresponding size is formatted according to the length and width of the website card popup window page.

In step S205, according to the display frame color value of the authentication information, a website card popup window page of corresponding color and default size is displayed, and the source of the authentication information and the website type information, as well as query failing information are displayed on the website card popup window page, and the method 200 ends up. When the first request fails, the browser displays the website card popup window page of corresponding color and default size according to the display frame color value of the authentication information, wherein the default size is preset value of browser. And then the source of the authentication information and the website type information are displayed on the website card popup window page, such as the content of "a hospital website authenticated by authentication and authorization institute", and the query failing information of "fail to inquire detailed information, please try again later" is displayed underneath. Optionally, the website card popup window page and the display picture of the authentication information align along center line.

After step S204, the method 200 enters into step S206, wherein the browser sends a second request to the network address authentication server, requesting for obtaining the display content information of the website card. The second request carries the domain name information of the website and the display picture information of the authentication information and/or the display frame color value of the authentication information. For example, suppose the interface address of the network address authentication server is: http://webid.360.cn/nameplate_v2.php. The second request can carry following parameters:

host=current domain name port number can be elided
key=md5(host+secret key) secret key is preset value
v=version number of a browser
m=m value of the cloud query result; md5 value for picture corresponding to the default "website card" when there is no query result
c=c value of the cloud query result; the value corresponding to the default "website card" when there is no query result, such as 1

After step S206, the method 200 enters into step S207, wherein the browser estimates whether the display content information of the website card returned by the network address authentication server in response to the second request is received or not. If yes, the method 200 enters into step S208; if not, the method 200 enters into step S209. If the browser receives the display content information of the website card, it is showing that the second request succeeds; if the browser does not receive the display content information of the website card, it is showing that the second request fails.

Figure 6:
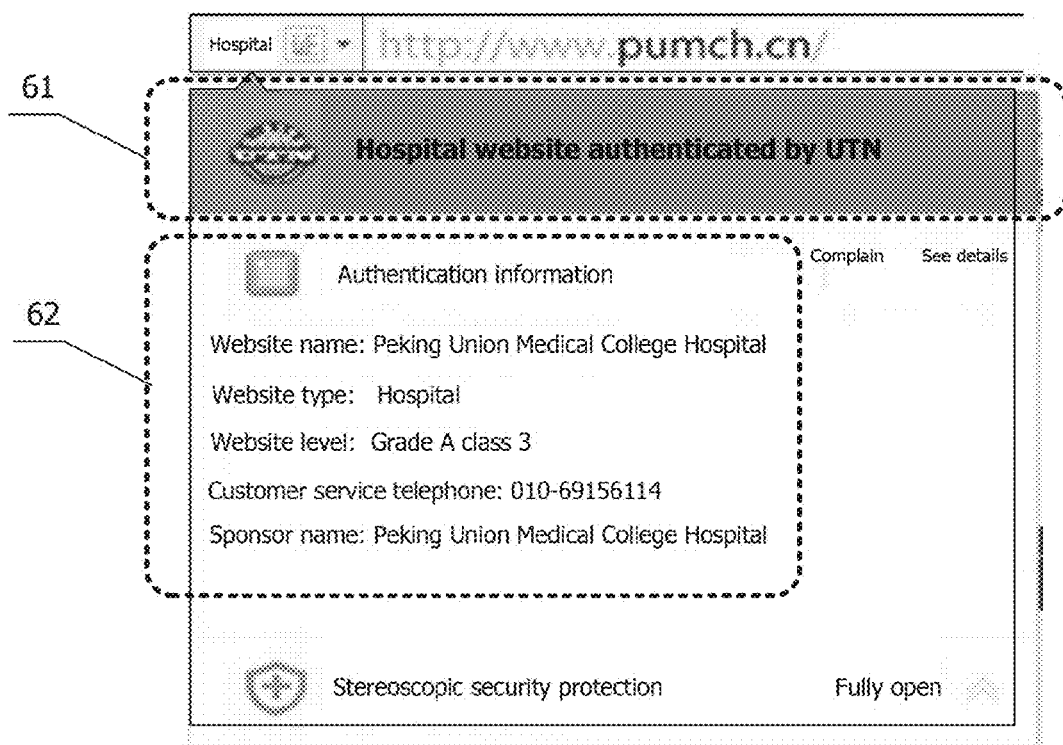
FIG. 6 shows a real picture for an example of website card popup window page.

In step S208, according to the size information of the website card popup window page, a website card popup window page is displayed, and the source of the authentication information and the website type information, as well as the display content information of the website card are displayed on the website card popup window page, and the method 200 ends up. Optionally, the website card popup window page and the display picture of the authentication information displayed by the browser align along center line, and the size of the website card popup window page is consistent with the size information of the website card popup window page, and the color of the website card popup window page is corresponding to the display frame color value of the authentication information. When the browser is on the margin of the screen, the part outside the screen is abandoned without processing the website card popup window page. FIG. 6 shows a real picture for an example of website card popup window page. As is shown in FIG. 6, the source of the authentication information (UTN) and the website type information (hospital) are displayed in Area 61 of the website card popup window page, that is, "a hospital website authenticated by UTN". The display content information of the website card is displayed in Area 62 of the website card popup window page, and the information is obtained via the second request. FIG. 6 is a grayscale image, thus the corresponding color is not displayed.

In step S209, according to the display frame color value of the authentication information and the size information of the website card popup window page, a website card popup window page of corresponding color and corresponding size is displayed, and the source of the authentication information and the website type information, as well as query failing information are displayed on the website card popup window page, and the method 200 ends up. When the second request fails, the browser displays the website card popup window page of corresponding color and corresponding size according to the display frame color value of the authentication information and the size information of the website card popup window page; and then the source of the authentication information and the website type information are displayed on the website card popup window page, such as the content of "a hospital website authenticated by authentication and authorization institute", and the query failing information of "fail to inquire detailed information, please try again later" is displayed underneath. Optionally, the website card popup window page and the display picture of the authentication information align along center line.

As another embodiment, when the second request fails, after the browser displays the website card popup window page of corresponding color and corresponding size according to the display frame color value of the authentication information and the size information of the website card popup window page, the source of the authentication information and the website type information can be displayed on the website card popup window page, and the information of "being inquiring information" can be displayed underneath. Keep waiting for the preset time (e.g. 5s). If the display content information of the website card returned by the network address authentication server in response to the second request is received within the present time, then the display content information of the website card is displayed on the website card popup window page at the location where the information of "being inquiring information" is displayed; If the display content information of the website card returned by the network address authentication server in response to the second request is not received within the present time, then the query failing information of "fail to inquire detailed information, please try again later" is displayed on the website card popup window page at the location where the information of "being inquiring information" is displayed.

Figure 7:
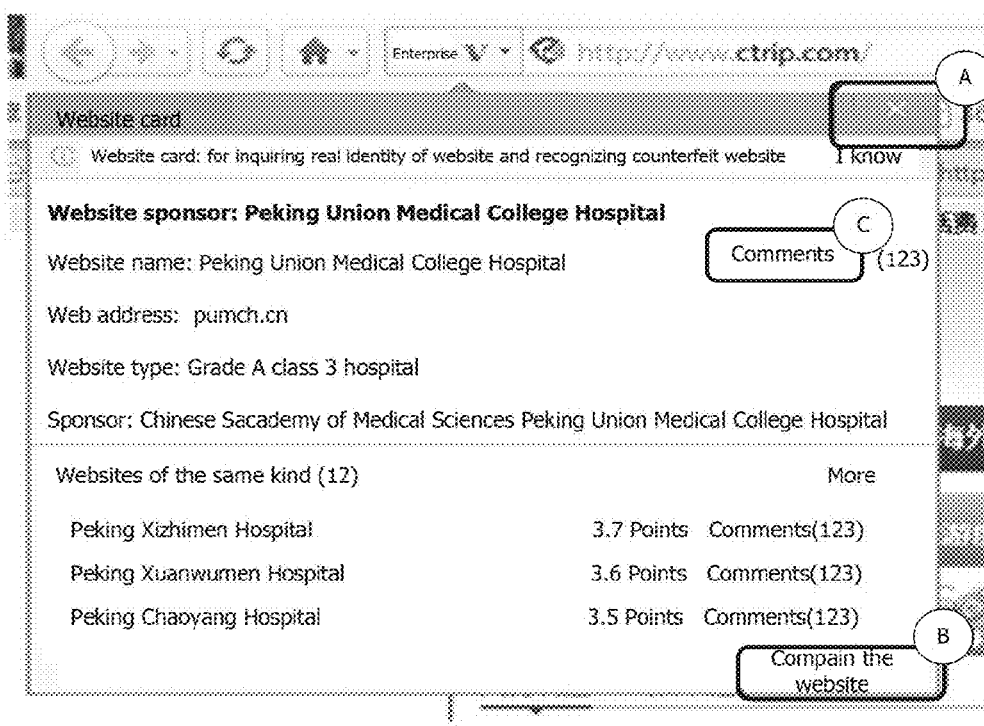
FIG. 7 shows a real picture for another example of website card popup window page.
Figure 8:
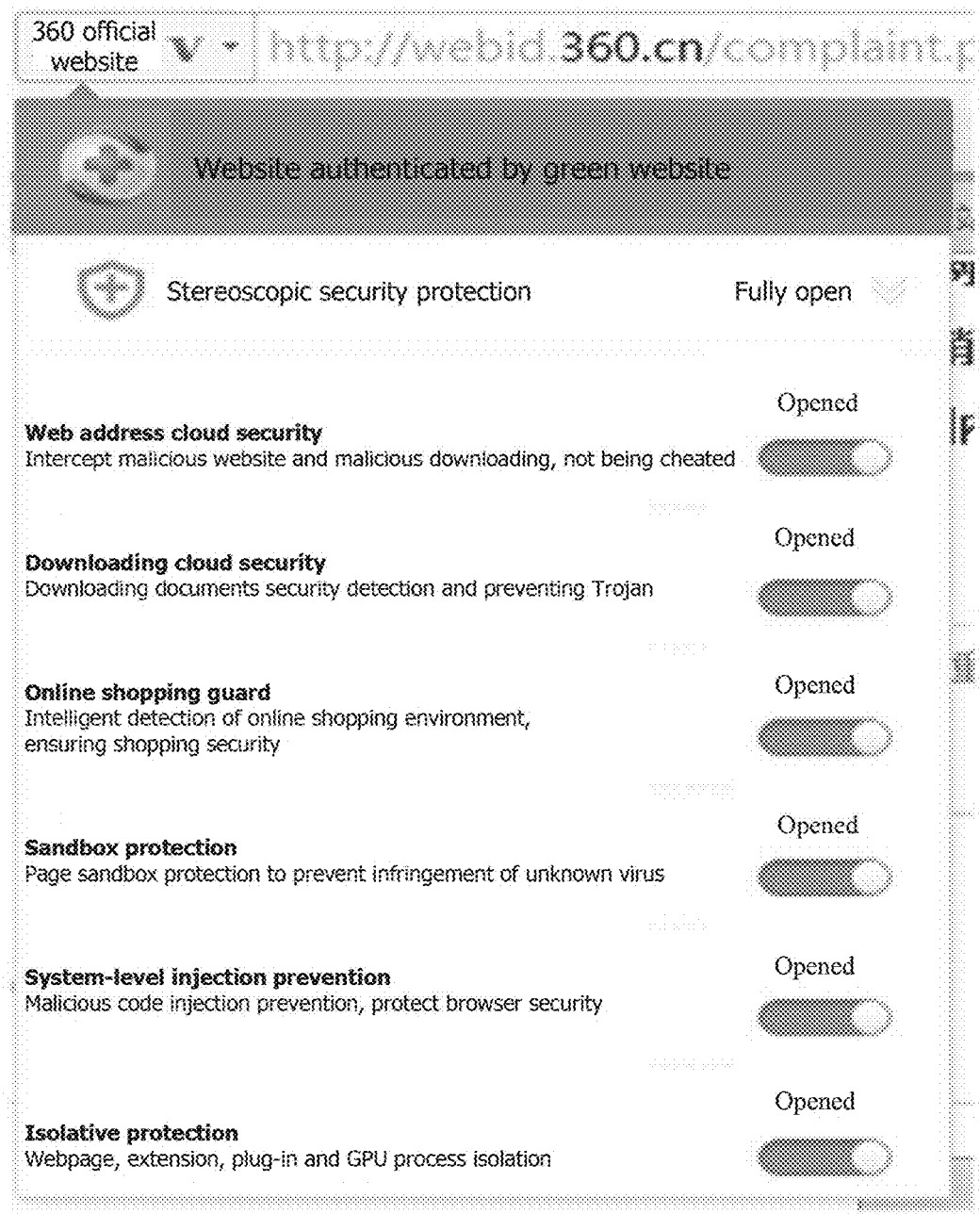
FIG. 8 shows a real picture for a security protection setting page.

FIG. 7 shows a real picture for another example of website card popup window page. As is shown in FIG. 7, the website card popup window page displays some extended information and options, such as "websites of the same kind", "complain the website", "comment", and the like. If users click Option A, a command to close the website card popup window page is triggered. The browser executes the operation of closing the website card popup window page after receiving the command. If users click Option B, a command to complain the website is triggered. The browser executes the operation of closing the website card popup window page and then opening the complaining page for users to input complaint after receiving the command. If users click Option C, a command to comment on the website is triggered. The browser executes the operation of closing the website card popup window page and then opening the commenting page for users to input comment after receiving the command. Furthermore, the website card popup window page can display a option of opening security protection. If users click this option, a command to open security protection is triggered. The browser displays setting items of security protection on the website card popup window page after receiving the command. See FIG. 8.

According to the method for displaying website authentication information provided by the disclosure, authentication parameter information of a website provided by a network address authentication server is acquired by cloud query after a network address change event is triggered. According to the authentication parameter information, the authentication information of the website is displayed in the browser. In this way, the information authenticated by authority can be displayed in real time when users visit the website, enabling the users to have a proper understanding of the security of the currently-visited website. The network address authentication server can provide an interface allowing various authentication and authorization institutes and authorized registration agencies to access its platform, so that the information included is from information of the browser provider, and/or website registration license information, and/or information provided by authentication and authorization institute. The source of the information is definitely authoritative and proper. Furthermore, in addition to displaying display picture of authentication information, the present method can further display website card. The authentication information displayed in the website card is more abundant and comprehensive, enabling the users to have a more comprehensive understanding of the currently-visited website. In the present method, the size of the website card popup window page is preset by assigned server. If the assigned server is a server of the browser provider, the server can self-define the size of the website card popup window page. Besides, website card includes additional function options, such as complaining, comment, opening security protection, and the like. By means of these additional functions, users' feedback information can be obtained to better serve the display of website authentication information.

Figure 9:
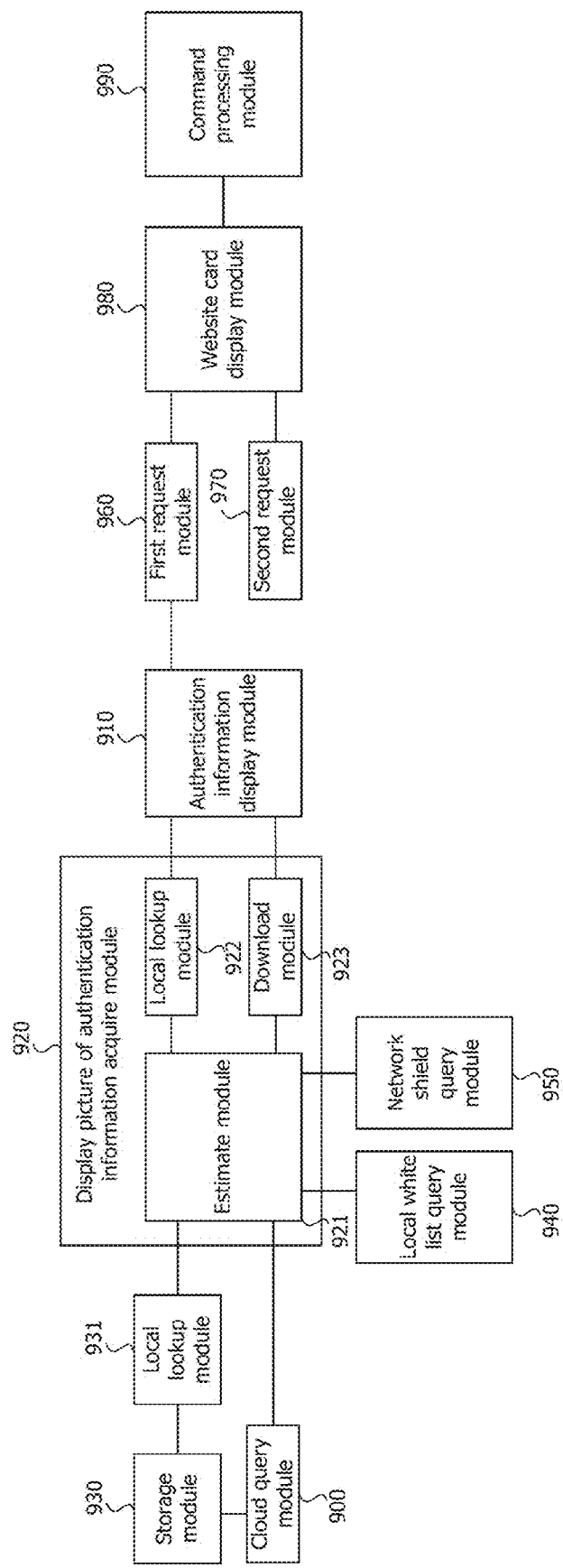
FIG. 9 shows a structural diagram for a browser according to an embodiment of the disclosure.

FIG. 9 shows a structural diagram for a browser according to an embodiment of the disclosure. As is shown in FIG. 9, the browser comprises: a cloud query module 900 and an authentication information display module 910; optionally, the browser also comprises a display picture of authentication information acquire module 920.

The cloud query module 900 is configured to acquire authentication parameter information of a website provided by a network address authentication server by cloud query after a network address change event is triggered. The authentication parameter information at least comprises display picture information of the authentication information, and the display picture information of the authentication information is generated by the network address authentication server according to the source of the authentication information and the website type information. Optionally, the display picture information of the authentication information is an MD5 value for the display picture of the authentication information. The authentication parameter information also comprises the following information: domain name information of the website and the display frame color value of the authentication information.

The network address authentication server is a server exclusively used for providing authentication information authenticated by authority for browser. The information included in the network address authentication server is mainly from information of the browser provider, and/or website registration license information, and/or information provided by authentication and authorization institute. Wherein information provided by the browser provider and authentication and authorization institute mainly includes authentication information of the following types of websites: enterprise, brand official website, school, shopping mall, group buying site, bank, hospital, game official website, government, public institution, and the like. The authentication and authorization institute usually provides corresponding information based on the process authenticated by CA (Certificate Authority) of the third party. The website registration license information is the information recorded by authorized registration institute, such as information recorded at the registration center of Ministry of Industry and Information ICP (telecom and information service business certificate of the People's Republic of China). The types of registered websites mainly comprises: enterprise, government, army, social organization, public institution and individual. The network address authentication server of the disclosure can be an open platform, and various authentication and authorization institutes and/or authorized registration agencies can access the platform via configured interface, so as to provide information for the network address authentication server.

The browser provides the URL of the website for the network address authentication server. The network address authentication server inquires the source of the authentication information and the website type information corresponding to the URL from the information included in the network address authentication server, and then processes the original display picture to obtain the display picture of the authentication information according to the source of the authentication information and the website type information corresponding to the URL, and then generates the MD5 value for the display picture of the authentication information. The source of the authentication information decides the authentication icon displayed on the display picture of the authentication information, and the background color and/or text color of the display picture of the authentication information. The website type information decides the text contents displayed on the display picture of the authentication information. As for the source of the authentication information and the specific content of the website type information, as well as the process of the network address authentication server obtaining the display picture of the authentication information, see the description of aforesaid embodiment of the method. It will not be repeated here.

For the data format of the authentication parameter information obtained by the cloud query module 900, see the description of aforesaid embodiment of the method.

The display picture of authentication information acquire module 920 is configured to download the display picture of the authentication information from the gallery or search for the display picture of the authentication information in the local directories of the browser according to the MD5 value for the display picture of the authentication information. Further, the display picture of authentication information acquire module 920 comprises: an estimate module 921, a local lookup module 922, and a download module 923. Wherein, the estimate module 921 is configured to estimate whether the display picture consistent with the MD5 value for the display picture of the authentication information is in the local directories of the browser or not. When the estimate module 921 estimates that the display picture consistent with the MD5 value for the display picture of the authentication information is in the local directories of the browser, the local lookup module 922 is configured to acquire the corresponding display picture as the display picture of the authentication information. When the estimate module 921 estimates that the display picture consistent with the MD5 value for the display picture of the authentication information is not in the local directories of the browser, the download module 923 is configured to download the display picture from the gallery as the display picture of the authentication information. The MD5 value for the display picture downloaded from the gallery is consistent with the MD5 value for the display picture of the authentication information.

The authentication information display module 910 is configured to display the authentication information of the website in the browser according to the authentication parameter information. Further, the authentication information display module 910 is configured to carry out display frame rendering on the display picture of the authentication information according to the display frame color value of the authentication information, and then display in the browser the display picture of the authentication information which has been processed by display frame rendering. If the display frame color value of the authentication information is 1, the display frame of the display picture of the authentication information is rendered as blue; if the display frame color value of the authentication information is 2, the display frame of the display picture of the authentication information is rendered as green.

According to fault-tolerance processing mechanism, when the download module 923 fails to download the display picture from the gallery, the authentication information display module 910 is further configured to not display the authentication information of the website in the browser; or when the domain name information of the website is empty or abnormal information, not display the authentication information of the website in the browser; or when the display frame color value of the authentication parameter information is not assigned numerical value, not display the authentication information of the website in the browser.

Further, in addition to acquiring the authentication parameter information of the website, the cloud query module 900 can also acquire an authentication parameter information list consisting of the authentication parameter information of websites corresponding to sub-domain names of over second level of the website. Specifically, the browser further comprises: a storage module 930 and a local lookup module 931. The storage module 930 is configured to store the authentication parameter information list in the browser locally; the local lookup module 931 is configured to directly inquire the authentication parameter information of the website in the storage module 930 after the network address change event of the websites corresponding to the sub-domain names of over second level of the website is triggered.

Optionally, the browser further comprises a local white list query module 940 and/or a network shield query module 950.

The local white list query module 940 is configured to inquire the local white list of the browser. If the website belongs in the local white list of the browser, acquire the authentication parameter information of the website locally via the browser; if the website does not belong in the local white list of the browser, the local white list query module 940 triggers the cloud query module 900 or the network shield query module 950 to work. Before the cloud query module 900 works, the local white list query module 940 first inquires the local white list, estimating whether the website belongs in the local white list of the browser or not. The local white list of the browser is credible white list, wherein storing URL of credible websites and authentication parameter information thereof. If the website belongs in the local white list, the local white list query module 940 directly acquires the authentication parameter information of the website locally. If the website does not belong in the local white list, in the case of the browser comprising the network shield query module 950, the local white list query module 940 triggers the network shield query module 950 to work; in the case of the browse not comprising the network shield query module 950, the local white list query module 940 triggers the cloud query module 900 to work.

The network shield query module 950 is configured to inquire the white list of the network shield. If the website belongs in the white list of the network shield, acquire the authentication parameter information of the website from the network shield server; if the website does not belong in the white list of the network shield, the network shield query module 950 triggers the cloud query module 900 to work. Before the cloud query module 900 works, the network shield query module 950 can inquire the white list of the network shield stored in the network shield server, estimating whether the website belongs in the white list of the network shield or not. If the website belongs in the white list of the network shield, the network shield query module 950 acquires the authentication parameter information of the website from the network shield server. If the website does not belong in the white list of the network shield, the network shield query module 950 triggers the cloud query module 900 to work.

In order to provide more detailed and comprehensive information for users, in addition to displaying aforesaid display picture of the authentication information, the browser provided by the disclosure can further display website card according to the command triggered by users.

Specifically, the browser further comprises: a first request module 960, a second request module 970 and a website card display module 980.

The first request module 960 is configured to send the first request to the assigned server according to the website card display command triggered by users, and receive the size information of the website card popup window page returned by the assigned server in response to the first request. So-called assigned server is the server for setting the size of the website card popup window page. It can be a server of the browser provider, or a web address authentication server. The first request carries the domain name information of the website (e.g. host). For example, suppose the interface address of the assigned server is: http://webid.360.cn/nameplate_v2_conf.php. The first request can carry following parameters:
  host=current domain name port number can be elided
  key=md5(host+secret key) secret key is preset value
  v=version number of a browser The second request module 970 is configured to send the second request to the network address authentication server, and receive the display content information of the website card returned by the network address authentication server in response to the second request. The second request carries the domain name information of the website and the display picture information of the authentication information and/or the display frame color value of the authentication information. For example, suppose the interface address of the network address authentication server is: http://webid.360.cn/nameplate_v2.php. The second request can carry following parameters:
  host=current domain name port number can be elided
  key=md5(host+secret key) secret key is preset value
  v=version number of a browser
  m=m value of the cloud query result; md5 value for picture corresponding to the default "website card" when there is no query result
  c=c value of the cloud query result; the value corresponding to the default "website card" when there is no query result, such as 1

The website card display module 980 is configured to display a website card popup window page according to the size information of the website card popup window page, and display the source of the authentication information and the website type information, as well as the display content information of the website card on the website card popup window page. Optionally, the website card popup window page and the display picture of the authentication information displayed by the browser align along center line, and the size of the website card popup window page is consistent with the size information of the website card popup window page, and the color of the website card popup window page is corresponding to the display frame color value of the authentication information. When the browser is on the margin of the screen, the part outside the screen is abandoned without processing the website card popup window page. See FIG. 6, the source of the authentication information (UTN) and the website type information (hospital) are displayed in Area 61 of the website card popup window page, that is, "a hospital website authenticated by UTN". The display content information of the website card is displayed in Area 62 of the website card popup window page, and the information is obtained via the second request.

The website card display module 980 is further configured to display a website card popup window page of corresponding color and default size according to the display frame color value of the authentication information when the first request fails, and display the source of the authentication information and the website type information, as well as the query failing information on the website card popup window page; When the second request fails, the website card popup window page of corresponding color and corresponding size is displayed according to the display frame color value of the authentication information and the size information of the website card popup window page; and the source of the authentication information and the website type information, as well as the query failing information are displayed on the website card popup window page.

As another embodiment, the website card display module 980 is further configured to display the website card popup window page of corresponding color and corresponding size according to the display frame color value of the authentication information and the size information of the website card popup window page when the second request fails, and display the source of the authentication information and the website type information, as well as information in query on the website card popup window page; waiting for the preset time, if the display content information of the website card returned by the network address authentication server in response to the second request is received within the present time, then the display content information of the website card is displayed on the website card popup window page; if the display content information of the website card returned by the network address authentication server in response to the second request is not received within the present time, then the query failing information is displayed.

Optionally, the website card popup window page of the browser can provide some additional functions, thus the browser further comprises: a command processing module 990, configured to close the website card popup window page according to the command to close the website card popup window page triggered by users; or close the website card popup window page and then open the complaining page according to the command to complain the website triggered by users; or close the website card popup window page and then open the commenting page according to the command to comment on the website; or display setting items of security protection on the website card popup window page according to the command to open the security protection triggered by users.

According to the browser provided by the disclosure, authentication parameter information of a website provided by a network address authentication server is acquired by cloud query after a network address change event is triggered. According to the authentication parameter information, the authentication information of the website can be displayed in the browser. In this way, the information authenticated by authority can be displayed in real time when users visit the website, enabling the users to have a proper understanding of the security of the currently-visited website. In the disclosure, the network address authentication server can provide an interface allowing various authentication and authorization institutes and authorized registration agencies to access its platform, so that the information included is from information of the browser provider, and/or website registration license information, and/or information provided by authentication and authorization institute. The source of the information is definitely authoritative and proper. Furthermore, in addition to displaying display picture of authentication information, the browser provided by the disclosure can further display website card. The authentication information displayed in the website card is more abundant and comprehensive, enabling the users to have a more comprehensive understanding of the currently-visited website. In the disclosure, the size of the website card popup window page is preset by assigned server. If the assigned server is a server of the browser provider, the server can self-define the size of the website card popup window page. Besides, website card includes additional function options, such as complaining, comment, opening security protection, and the like. By means of these additional functions, users' feedback information can be obtained to better serve the display of website authentication information.

The algorithm and display provided here have no inherent relation with any specific computer, virtual system or other devices. Various general-purpose systems can be used together with the teaching based on this. According to the description above, the structure required to construct this kind of system is obvious. Besides, the disclosure is not directed at any specific programming language. It should be understood that various programming language can be used for achieving the content of the disclosure described here, and above description of specific language is for disclosing the optimum embodiment of the disclosure.

The description provided here explains plenty of details. However, it can be understood that the embodiments of the disclosure can be implemented without these specific details. The known methods, structure and technology are not shown in detail in some embodiments, so as not to obscure the understanding of the description.

Similarly, it should be understood that in order to simplify the present disclosure and help to understand one or more of the various aspects of the disclosure, the various features of the disclosure are sometimes grouped into a single embodiment, drawing, or description thereof. However, the method disclosed should not be explained as reflecting the following intention: that is, the disclosure sought for protection claims more features than the features clearly recorded in every claim. To be more precise, as is reflected in the following claims, the aspects of the disclosure are less than all the features of a single embodiment disclosed before. Therefore, the claims complying with a specific embodiment are explicitly incorporated into the specific embodiment thereby, wherein every claim itself as an independent embodiment of the disclosure.

Those skilled in the art can understand that adaptive changes can be made to the modules of the devices in the embodiment and the modules can be installed in one or more devices different from the embodiment. The modules or units or elements in the embodiment can be combined into one module or unit or element, and furthermore, they can be separated into more sub-modules or sub-units or sub-elements. Except such features and/or process or that at least some in the unit are mutually exclusive, any combinations can be adopted to combine all the features disclosed by the description (including the attached claims, abstract and figures) and any method or all process of the device or unit disclosed as such. Unless there is otherwise explicit statement, every feature disclosed by the present description (including the attached claims, abstract and figures) can be replaced by substitute feature providing the same, equivalent or similar purpose.

In addition, a person skilled in the art can understand that although some embodiments described here comprise some features instead of other features included in other embodiments, the combination of features of different embodiments means falling into the scope of the disclosure and forming different embodiments. For example, in the following claims, any one of the embodiments sought for protection can be used in various combination modes.

The various components embodiments of the disclosure can be realized by hardware, or realized by software modules running on one or more processors, or realized by combination thereof. A person skilled in the art should understand that microprocessor or digital signal processor (DSP) can be used for realizing some or all functions of some or all components of the devices for displaying the website authentication information according to the embodiments in the disclosure in practice. The disclosure can also realize one part of or all devices or programs (for example, computer programs and computer program products) used for carrying out the method described here. Such programs for realizing the disclosure can be stored in computer readable medium, or can possess one or more forms of signal. Such signals can be downloaded from the Internet website or be provided at signal carriers, or be provided in any other forms.

Figure 10:
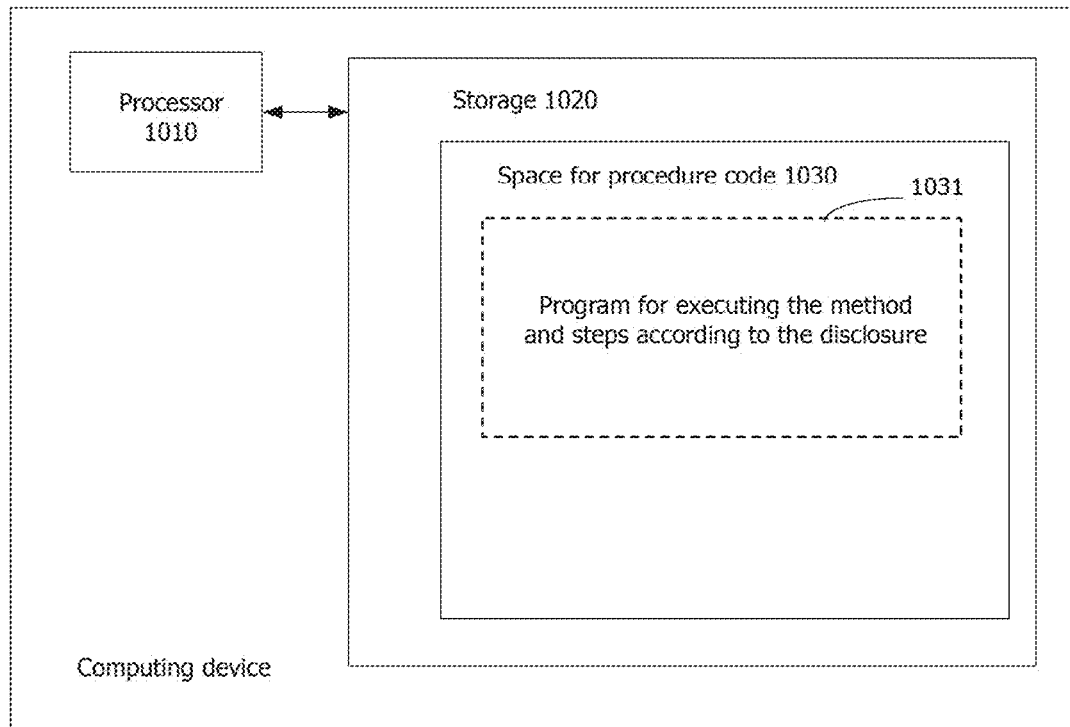
FIG. 10 schematically shows a diagram for a computing device for executing the method for displaying website authentication information according to the disclosure.
Figure 11:
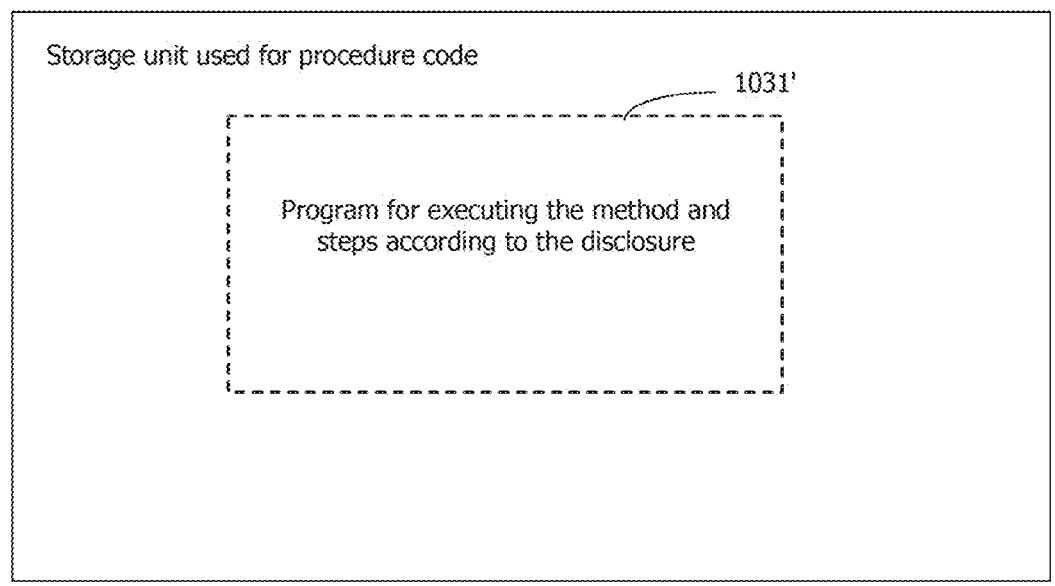
FIG. 11 schematically shows a storage unit used for keeping or carrying procedure code for executing the method for displaying website authentication information according to the disclosure.

For example, FIG. 10 shows a diagram for a computing device for executing the method for displaying website authentication information according to the disclosure. The computing device traditionally comprises a processor 1010 and a computer program product in the form of storage 1020 or a computer readable medium. The storage 1020 can be electronic storage such as flash memory, EEPROM (Electrically Erasable Programmable Read-Only Memory), EPROM, hard disk or ROM, and the like. Storage 1020 possesses storage space 1030 for carrying out procedure code 1031 of any steps of aforesaid method. For example, storage space 1030 for procedure code can comprise various procedure codes 1031 used for realizing any steps of aforesaid method. These procedure codes can be read out from one or more computer program products or write in one or more computer program products. The computer program products comprise procedure code carriers such as hard disk, Compact Disc (CD), memory card or floppy disk and the like. These computer program products usually are portable or fixed storage cell as said in FIG. 11. The storage cell can possess memory paragraph, storage space like the storage 1020 in the computing device in FIG. 10. The procedure code can be compressed in, for example, a proper form. Generally, storage cell comprises computer readable code 1031, i.e. the code can be read by processors such as 1010 and the like. When the codes run on a computer device, the computer device will carry out various steps of the method described above.

The "an embodiment", "embodiments" or "one or more embodiments" referred here mean being included in at least one embodiment in the disclosure combining specific features, structures or characteristics described in the embodiments. In addition, please note that the phrase "in an embodiment" not necessarily mean a same embodiment.

It should be noticed that the embodiments are intended to illustrate the disclosure and not limit this disclosure, and a person skilled in the art can design substitute embodiments without departing from the scope of the appended claims. In the claims, any reference marks between brackets should not be constructed as limit for the claims. The word "comprise" does not exclude elements or steps that are not listed in the claims. The word "a" or "one" before the elements does not exclude that more such elements exist. The disclosure can be realized by means of hardware comprising several different elements and by means of properly programmed computer. In the unit claims several devices are listed, several of the devices can be embodied by a same hardware item. The use of words first, second and third does not mean any sequence. These words can be explained as name.

In addition, it should be noticed that the language used in the disclosure is chosen for the purpose of readability and teaching, instead of for explaining or limiting the topic of the disclosure. Therefore, it is obvious for a person skilled in the art to make a lot of modification and alteration without departing from the scope and spirit of the appended claims. For the scope of the disclosure, the disclosure is illustrative instead of restrictive. The scope of the disclosure is defined by the appended claims.

The invention claimed is:

1. A method for displaying website authentication information realized by an electronic device, comprising:
    acquiring locally via a browser authentication parameter information of a website provided by a network address authentication server by cloud query after a network address change event is triggered by the browser; said authentication parameter information at least comprises display picture information of authentication information, and said display picture information of the authentication information is generated by said network address authentication server according to a source of said authentication information and website type information;
    displaying the authentication information of said website in a browser according to said authentication parameter information, and
    according to a MD5 value for a display picture of said authentication information, downloading the display picture of said authentication information from a gallery or searching for the display picture of said authentication information in local directories of the browser,
    the step of downloading the display picture of said authentication information from a gallery or searching for the display picture of said authentication information in local directories of the browser further comprises:
    estimating whether a display picture consistent with the MD5 value for the display picture of said authentication information exists in the local directories of the browser or not;
    if yes, acquiring corresponding display picture as the display picture of said authentication information;
    if not, downloading a display picture from the gallery as the display picture of said authentication information, and the MD5 value for the display picture downloaded from the gallery is consistent with the MD5 value for the display picture of said authentication information.

2. The method according to claim 1, wherein information included in said network address authentication server is from information of a browser provider, and/or website registration license information, and/or information provided by an authentication and authorization institute;
    on the basis of a network address of a website provided by the browser, said network address authentication server inquires the source of the authentication information and the website type information corresponding to said network address from the information included in said network address authentication server, and then according to the source of the authentication information and the website type information corresponding to said network address, processes an original display picture to obtain a display picture of the authentication information, and then generates an MD5 value for the display picture of the authentication information.

3. The method according to claim 1, further comprising: according to a MD5 value for a display picture of said authentication information, downloading the display picture of said authentication information from a gallery or searching for the display picture of said authentication information in local directories of the browser;
the step of according to said authentication parameter information, displaying the authentication information of said website in the browser further comprises:
carrying out display frame rendering on the display picture of said authentication information according to a display frame color value of said authentication information, and then displaying in the browser the display picture of the authentication information which has been processed by display frame rendering.

4. The method according to claim 1, wherein in addition to acquiring the authentication parameter information of said website, an authentication parameter information list consisting of authentication parameter information of websites corresponding to sub-domain names of over second level of said website is also acquired by cloud query and is stored in the browser locally; after a network address change event of the websites corresponding to the sub-domain names of over second level of said website is triggered, directly inquiring the authentication parameter information of the website in the browser locally, and according to the authentication parameter information, displaying the authentication information of the website in the browser.

5. The method according to claim 1, wherein before the step of acquiring authentication parameter information of the website provided by the network address authentication server by cloud query, the method further comprises:
inquiring a local white list of the browser, if said website belongs in the local white list of the browser, acquiring the authentication parameter information of said website locally via the browser, and according to said authentication parameter information, displaying the authentication information of said website in the browser;
if said website does not belong in the local white list of the browser, acquiring the authentication parameter information of the website provided by the network address authentication server by cloud query.

6. The method according to claim 1, wherein before the step of acquiring the authentication parameter information of the website provided by the network address authentication server by cloud query, the method further comprises:
inquiring a white list of a network shield, if said website belongs in the white list of the network shield, acquiring the authentication parameter information of said website from a network shield server, and according to said authentication parameter information, displaying the authentication information of said website in the browser;
if said website does not belong in the white list of the network shield, executing the step of acquiring the network address authentication parameter information of the website provided by the network address authentication server by cloud query.

7. The method according to claim 1, wherein said authentication parameter information further comprises a source of said authentication information and website type information;
after the step of displaying the authentication information of said website in the browser, the method further comprising:
according to a command to display a website card triggered by users, sending a first request to an assigned server and receiving size information of a website card popup window page returned by said assigned server in response to said first request;
sending a second request to said network address authentication server and receiving display content information of the website card returned by said network address authentication server in response to said second request;
according to the size information of the website card popup window page, displaying the website card popup window page and displaying the source of said authentication information and the website type information as well as the display content information of the website card on said website card popup window page.

8. The method according to claim 7, further comprising: if said first request fails, displaying the website card popup window page of corresponding color and default size according to display frame color value of said authentication information and displaying the source of said authentication information and the website type information, as well as query failing information on said website card popup window page;
if said second request fails, displaying the website card popup window page of corresponding color and corresponding size according to display frame color value of said authentication information and the size information of the website card popup window page, and displaying the source of said authentication information and the website type information, as well as query failing information on said website card popup window page.

9. The method according to claim 7, further comprising: if said second request fails, displaying the website card popup window page of corresponding color and corresponding size according to display frame color value of said authentication information and the size information of the website card popup window page, and displaying the source of said authentication information and the website type information, as well as information that is being searched on said website card popup window page;
waiting for preset time, if the display content information of the website card returned by said network address authentication server in response to said second request is received within said preset time, then displaying the display content information of said website card on said website card popup window page; if the display content information of the website card returned by said network address authentication server in response to said second request is not received within said preset time, then displaying query failing information on said website card popup window page.

10. An electronic device for displaying website authentication information, comprising:
at least one processor; and
a memory communicably connected with the at least one processor for storing instructions executable by the at least one processor, wherein execution of the instructions by the at least one processor causes the at least one processor to:

acquire locally via a browser authentication parameter information of a website provided by a network address authentication server by cloud query after a network address change event is triggered by the browser; said authentication parameter information at least comprises display picture information of authentication information, and said display picture information of the authentication information is generated by said network address authentication server according to a source of said authentication information and website type information;

display the authentication information of said website in a browser according to said authentication parameter information; and download the display picture of the authentication information from a gallery or search for a display picture of the authentication information in local directories of the browser according to a MD5 value for the display picture of said authentication information;

the step of downloading the display picture of said authentication information from a gallery or searching for the display picture of said authentication information in local directories of the browser further comprises:

estimating whether a display picture consistent with the MD5 value for the display picture of said authentication information exists in the local directories of the browser or not;

if yes, acquiring corresponding display picture as the display picture of said authentication information;

if not, downloading a display picture from the gallery as the display picture of said authentication information and the MD5 value for the display picture downloaded from the gallery is consistent with the MD5 value for the display picture of said authentication information.

11. The electronic device according to claim 10, wherein information included in said network address authentication server is from information of a browser provider, and/or website registration license information, and/or information provided by an authentication and authorization institute;

on the basis of a network address of a website provided by the browser, said network address authentication server inquires the source of the authentication information and the website type information corresponding to said network address from the information included in said network address authentication server, and then according to the source of the authentication information and the website type information corresponding to said network address, processes an original display picture to obtain a display picture of the authentication information, and then generates an MD5 value for the display picture of the authentication information.

12. The electronic device according to claim 10, wherein the execution of the instructions by the at least one processor further causes the at least one processor to: download a display picture of the authentication information from a gallery or search for the display picture of the authentication information in local directories of the browser according to a MD5 value for the display picture of said authentication information;

the step of displaying the authentication information of said website in the browser according to said authentication parameter information further comprises: carrying out display frame rendering on the display picture of said authentication information according to a display frame color value of said authentication information, and then displaying in the browser the display picture of the authentication information which has been processed by display frame rendering.

13. The electronic device according to claim 10, wherein the execution of the instructions by the at least one processor further causes the at least one processor to:

acquire by cloud query and store in the browser locally an authentication parameter information list consisting of authentication parameter information of websites corresponding to sub-domain names of over second level of said website;

after a network address change event of the websites corresponding to the sub-domain names of over second level of said website is triggered, directly inquire the authentication parameter information of the website in the browser locally, and according to the authentication parameter information, display the authentication information of the website in the browser.

14. The electronic device according to claim 10, wherein the execution of the instructions by the at least one processor further causes the at least one processor to: before the step of acquiring authentication parameter information of the website provided by the network address authentication server by cloud query, inquire a local white list of the browser, if said website belongs in the local white list of the browser, acquire the authentication parameter information of said website locally via the browser, and according to said authentication parameter information, display the authentication information of said website in the browser;

if said website does not belong in the local white list of the browser, acquire the authentication parameter information of the website provided by the network address authentication server by cloud query.

15. The electronic device according to any of claim 10, wherein the execution of the instructions by the at least one processor further causes the at least one processor to: after the step of displaying the authentication information of said website in the browser, send a first request to an assigned server according to a command to display a website card triggered by users, and receive size information of a website card popup window page returned by said assigned server in response to said first request;

send a second request to said network address authentication server, and receive display content information of the website card returned by said network address authentication server in response to said second request;

display the website card popup window page according to the size information of the website card popup window page, and display the source of said authentication information and the website type information, as well as the display content information of the website card on said website card popup window page.

16. The electronic device according to claim 15, wherein the execution of the instructions by the at least one processor further causes the at least one processor to: if said first request fails, display the website card popup window page of corresponding color and default size according to display frame color value of said authentication information, and display the source of said authentication information and the website type information, as well as query failing information on said website card popup window page; if said second request fails, display the website card popup window page of corresponding color and corresponding size according to the display frame color value of said authentication information and the size information of the website card popup window page, and display the source of said authentication information and the website type information, as well as query failing information on said website card popup window page.

17. The electronic device according to claim 15, wherein the execution of the instructions by the at least one processor further causes the at least one processor to: display the website card popup window page of corresponding color and corresponding size according to display frame color value of said authentication information and the size information of the website card popup window page, and display the source of said authentication information and the website type information, as well as information that is being searched on said website card popup window page if said second request fails; waiting for preset time, if the display content information of the website card returned by said network address authentication server in response to said second request is received within said preset time, then display the display content information of said website card on said website card popup window page; if the display content information of the website card returned by said network address authentication server in response to said second request is not received within said preset time, then display query failing information on said website card popup window page.

18. A non-transitory computer readable medium having instructions stored thereon that, when executed by at least one processor, cause the at least one processor to perform operations of displaying website authentication information, comprising:

acquiring locally via a browser authentication parameter information of a website provided by a network address authentication server by cloud query after a network address change event is triggered by the browser; said authentication parameter information at least comprises display picture information of authentication information, and said display picture information of the authentication information is generated by said network address authentication server according to a source of said authentication information and website type information;

displaying the authentication information of said website in a browser according to said authentication parameter information; and according to a MD5 value for a display picture of said authentication information, downloading the display picture of said authentication information from a gallery or searching for the display picture of said authentication information in local directories of the browser, the step of downloading the display picture of said authentication information from a gallery or searching for the display picture of said authentication information in local directories of the browser further comprises:

estimating whether a display picture consistent with the MD5 value for the display picture of said authentication information exists in the local directories of the browser or not;

if yes, acquiring corresponding display picture as the display picture of said authentication information;

if not, downloading a display picture from the gallery as the display picture of said authentication information, and the MD5 value for the display picture downloaded from the gallery is consistent with the MD5 value for the display picture of said authentication information.

* * * * *